M. F. PATTON.
DEMOUNTABLE RIM.
APPLICATION FILED JULY 20, 1916.

1,231,644.

Patented July 3, 1917.

Inventor
Moses F. Patton.

Witness

By

Attorney

UNITED STATES PATENT OFFICE.

MOSES F. PATTON, OF TUSCALOOSA, ALABAMA.

DEMOUNTABLE RIM.

1,231,644.

Specification of Letters Patent.

Patented July 3, 1917.

Application filed July 20, 1916. Serial No. 110,332.

*To all whom it may concern:*

Be it known that I, MOSES F. PATTON, a citizen of the United States of America, residing at Tuscaloosa, in the county of Tuscaloosa and State of Alabama, have invented certain new and useful Improvements in Demountable Rims, of which the following is a specification.

My invention relates to demountable rims for automobile tires and has for its object to provide a novel and effective means for contracting and expanding the demountable rim so that a pneumatic tire can be easily mounted thereon and detached therefrom.

A further object of my invention is to adapt the contracting and expanding elements for the split rim to hold its ends in alinement.

A further object of my invention is to design the wheel felly to receive the rim adjusting elements in a countersunk seat and to provide novel means to tie the ends of the felly band in said seat so that it can be shrunk tight on the felly.

These and other objects of my invention are hereinafter more particularly described by reference to the accompanying drawings which form a part of this specification, and in which:—

Similar reference numerals refer to similar parts throughout the drawings.

Figure 1:
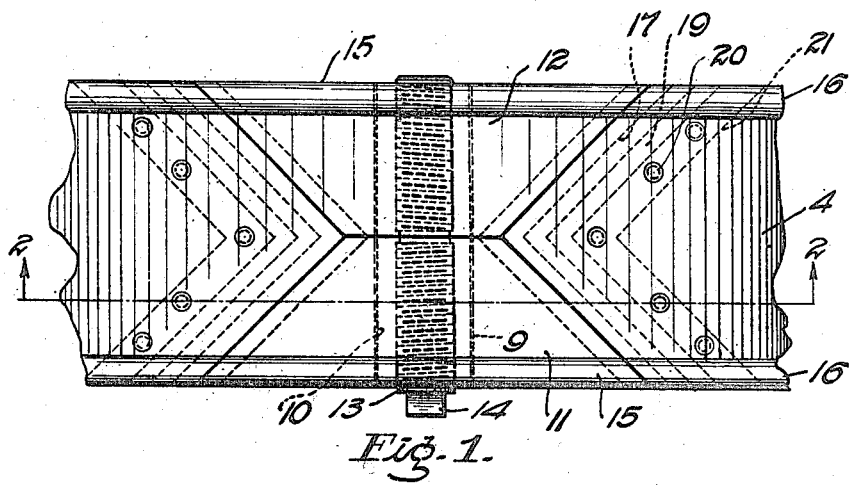
Figure 1 is a partial view of a section of the demountable rim showing its expanding, contracting and centering means in plan.
Figure 2:
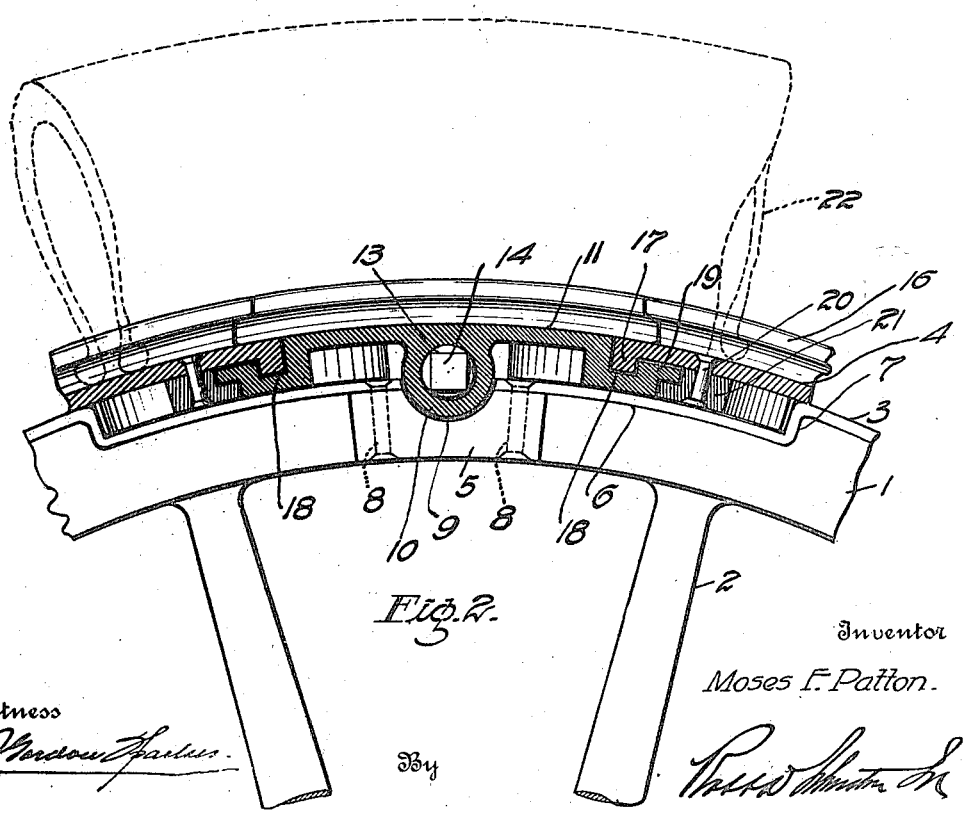
Fig. 2 is a vertical sectional view of a portion of the demountable rim and felly taken on the line 2—2 of Fig. 1, the felly band and felly being shown in elevation.

In the embodiment of my invention illustrated, I show a wooden wheel felly 1 supported on spokes 2 and having a felly band 3 shrunk thereon. Beneath the expanding and contracting mechanism for the demountable rim 4, the wooden felly is parted and a metallic block 5 is inserted. On each side of this block, which is of less depth than the felly itself, the adjacent ends of the felly are also cut away to form a countersunk seat 6 with its outer face curved circumferentially and with its end walls substantially radially disposed. The band 3 is shaped to fit down into this seat and its ends are connected by rivets 8 to the ends of the metallic insert block 5 which they overlap and extend to a curved seat 9 disposed transversely across the middle of the block and designed to receive the rounded transverse shoulders 10 on the bottom of the wedge shaped actuators 11 and 12 for the demountable rim. The shoulders 10 in vertical cross section are rounded so as to fit snugly into the curved seat 9 and they are provided with reversely threaded openings in transverse alinement across the rim which receive the expanding and contracting screw 13, the ends of which are reversely threaded and one end of which is provided with a square wrench head 14. The wedge actuators 11 and 12 are similar but reversely disposed as will be observed in Fig. 1, each having its end edges converging from the side edges of the rim to its circumferential center line at an angle of about 45°, and each actuator, at its outer side edge, ha a bead 15 designed to form a continuation of the beads 16 on the side edges of the demountable rim. The ends of the demountable rim are tapered to conform to the inclination of the side edges of the actuators and the taper end edges are bent down to form lips 17 which are each adapted to fit into a recess 18 provided by bending the taper end edges of the actuators 11 and 12 downwardly for the depth of the seat 6 and then along under the lips 17 and upwardly to engage the under face of the rim and form an overhanging shoulder 19. The center main wedge shaped body portion of each actuator is raised to form a flush continuation of the outer surface of the rim 4. In order to connect the demountable rim ends to the actuators, I connect by rivets 20 to the underface of each rim end a V-shaped angle or block 21 which has its inside upper corner edge undercut to interfit with the shoulder 19. It will be understood that this locking arrangement permits the angled end edges of the actuators to slide in the ways formed for them by the lips 17 and blocks 21 and in doing so to act as a double wedge to push apart and pull together the rim ends.

In operation, the screw 13 is turned so as to force the locking members apart and in moving in this manner the rims co-act with the end lips 17 and with the V-blocks 21 on the rim ends to draw the latter together until the demountable rim is contracted when the tire 22 can be readily put on or taken off. After the new or repaired tire is in place on the contracted rim, the screw 13 is then operated to draw the members 11 and 12 together, in doing which the co-acting wedge lips 17 and shoulders 19 will act to force the ends of the rim apart to expand the rim and tighten its engagement with the tire until the latter is securely held in place thereon. The rim with the tire fast thereon is slipped on the felly with the shoulders 10 resting in the seat 9 in the block 5. It will also be noted that the actuators 11 and 12 being controlled by the same screw will move equally in opposite directions and will always, through the interlocking wedge faces on the actuators and rim ends, hold the latter positively in alinement and when the actuators have been drawn tightly together they serve the function of holding the rim ends against lateral displacement. It will be noted that the actuators form, when in operating position, an uninterrupted continuation of the surface of the demountable rim 4 that receives and supports the tire 22, and that the shoulders 10 will assist in holding the rim against traction strains which tend to move it circumferentially on the felly.

The felly band can be mounted and shrunk on the felly in the manner well understood and by parting it and connecting its ends to the metal block 5, the ends of the wooden felly will be drawn tightly against this block which is thus simply and strongly incorporated in the felly and the latter is not weakened to make place for the adjusting mechanism under the ends of the split demountable rim.

Having thus described my invention, what I claim as new and desire to secure by Letters Patent, is:—

1. A centering and fastening means for split demountable rims comprising in combination a pair of reversely tapering rim actuators, means to move said actuators toward and from each other transversely of the rim, said actuators when drawn together forming a section of the rim, and taper means at the rim ends which slidably interlock with the taper edges of said actuators, substantially as described.

2. A split demountable rim having a portion thereof formed by two transversely movable members interposed between the rim ends and having similarly but reversely tapering end edges, the ends of the rim proper having a complementary taper and having portions inclined to correspond with and disposed to slidably interlock with the tapering end portions of said movable rim members, and means to move said rim members toward or from each other to loosen or tighten the rim.

3. A split demountable rim having oppositely disposed movable rim portions between the rim ends, co-acting wedging members on the rim ends and movable rim portions disposed to contract the rim as the rim portions are moved apart and to expand the rim as said portions are moved toward each other, and means to move the rim portions as described.

4. In combination, a demountable rim which is split and has under its ends lips which converge from the sides in opposite directions toward the center of each end, two actuators each having channels at its ends which underlie the rim ends and which receive a lip on each end of the rim and are similarly disposed, means to move the actuators in opposite directions to contract or expand the rim.

5. The combination with a split demountable rim having V-shaped ends, of a pair of reversely disposed wedge shaped rim sections adapted, when juxtaposed, to fill out the space between the rim ends, beads on said adjustable portions adapted to form a continuation of the rim beads, a double-acting wedge formed by engaging members on said rim portions and on the V-shaped rim ends, and means to move said rim portions transversely of the rim to actuate the wedge for the purposes described.

6. A split demountable rim having oppositely disposed movable rim portions between the rim ends, a double acting wedge means connecting said rim portions to the rim ends, shoulders under said portions, a reversely threaded screw in threaded engagement with said shoulders, and a wheel felly countersunk to receive said double acting wedge means and shoulders, substantially as described.

In testimony whereof I affix my signature.

MOSES F. PATTON.

Witnesses:
SAM L. FLIPPEN,
JOE W. FLIPPEN.